United States Patent [19]
Nishiyama et al.

[11] Patent Number: 5,107,814
[45] Date of Patent: Apr. 28, 1992

[54] FUEL CONTROL APPARATUS FOR AN INTERNAL COMBUSTION ENGINE

[75] Inventors: Ryoji Nishiyama, Amagasaki; Setsuhiro Shimomura, Himeji, both of Japan

[73] Assignee: Mitsubishi Denki K.K., Tokyo, Japan

[21] Appl. No.: 686,358

[22] Filed: Apr. 17, 1991

[30] Foreign Application Priority Data

Apr. 19, 1990 [JP] Japan .................. 2-105556

[51] Int. Cl.$^5$ .................................................. F02M 7/00
[52] U.S. Cl. .................................... 123/435; 123/425
[58] Field of Search ............. 123/435, 492, 478, 480, 123/442, 425, 486; 364/431.05, 431.07, 431.04

[56] References Cited

U.S. PATENT DOCUMENTS

| | | | |
|---|---|---|---|
| 4,896,642 | 1/1990 | Washino et al. | 123/435 |
| 4,903,665 | 2/1990 | Washino et al. | 123/435 |
| 4,913,118 | 4/1990 | Watanabe | 123/435 |
| 4,928,654 | 5/1990 | Hosaka | 123/486 |
| 4,951,630 | 8/1990 | Iwata | 123/435 |
| 4,962,739 | 10/1990 | Wataya | 123/435 |
| 4,971,009 | 11/1990 | Washino et al. | 123/435 |
| 4,971,010 | 11/1990 | Iwata | 123/435 |
| 4,981,126 | 1/1991 | Kurihara | 123/492 |
| 4,996,644 | 2/1991 | Fukuchi et al. | 364/431.05 |
| 4,996,960 | 3/1991 | Nishiyama et al. | 123/435 |
| 5,027,775 | 7/1991 | Iwata | 123/425 |

FOREIGN PATENT DOCUMENTS

| | | | |
|---|---|---|---|
| 59-103965 | 6/1984 | Japan | 123/435 |
| 59-221433 | 12/1984 | Japan | 123/435 |
| 62-195464 | 8/1987 | Japan | 123/435 |

Primary Examiner—Raymond A. Nelli
Attorney, Agent, or Firm—Sughrue, Mion, Zinn, Macpeak & Seas

[57] ABSTRACT

A fuel control apparatus is provided for an internal combustion engine which has good response in fuel control during engine acceleration while incurring no reduction in the output torque.

10 Claims, 9 Drawing Sheets

FUEL CONTROL APPARATUS FOR AN INTERNAL COMBUSTION ENGINE

BACKGROUND OF THE INVENTION

The present invention relates to a fuel control apparatus for an internal combustion engine for controlling the amount of fuel suppled to the engine.

FIG. 8 illustrates an example of a conventional fuel control apparatus for an engine as described in Japanese Patent Laid-Open No. 59-103965. The apparatus illustrated is used for a four-cylinder gasoline engine 1 of an automotive vehicle. The engine 1 includes four cylinders 1a (only one is illustrated for the sake of simplicity in explanation), an intake pipe or manifold 3, a throttle valve 4 in the intake manifold 3, an injector 5 for each cylinder 1a for injecting fuel thereto, an intake valve 6 for each cylinder 1a, an exhaust manifold 7, an exhaust valve 8 for each cylinder 1a, a spark plug 9 for each cylinder 1a, a distributor 10, pressure sensors 11 each sensing the absolute internal pressure in a corresponding cylinder 1a, and a signal generator 12 for sensing the rotational angle of the engine. The signal generator 12 includes a top dead center sensor 12a which takes out a signal from a gear operatively connected with a camshaft, which rotates in synchrony with the rotation of the engine crankshaft, for sensing when the piston in a first cylinder is at top dead center, and a crank angle sensor 12b which takes out a signal from the gear for sensing the crank angle or position of the crankshaft. An intake air temperature sensor 14 is mounted in the intake manifold 3 for sensing the temperature of intake air sucked into the cylinders 1a. An engine coolant temperature sensor 15 is mounted on the side wall of each cylinder 1a for sensing the temperature of an engine coolant. An air-fuel ratio sensor 16 is mounted in the exhaust manifold 7 for sensing the air-fuel ratio of a mixture supplied to the cylinders 1a based on the concentration of certain component such as oxygen in the exhaust gas. An ignition coil and igniter combination 17 supplies a high voltage to the distributor 10 causing each spark plug 9 to generate a spark. An electronic control unit 100 (hereinafter referred to as an ECU) successively calculates an appropriate amount of fuel to be injected into each cylinder 1a and an appropriate ignition timing based on the output signals from the sensors 11 through 16, and controls the injector 5 and the ignition coil and igniter combination 17 on the basis of the fuel injection amount and the ignition timing thus calculated. The ECU 100 may be a digital computer including a CPU in the form of a microprocessor, a ROM, a RAM and an I/O interface having an input port and an output port, all of which are interconnected to each other through a bidirectional bus.

FIG. 9 shows various control timings of the various processings or operations of the above-described conventional apparatus. As shown in FIG. 9, the intake valve 6 for the first cylinder 1a closes at a crank angle of 30 degrees after bottom dead center (BDC2), and after the lapse of 10 degrees from the closing of the intake valve 6 or at a crank angle of 40 degrees after bottom dead center, the ECU 100 measures the internal pressure in each cylinder 1a. When the crankshaft of the engine 1 rotates to reach top dead center (TDC2), the ECU 100 calculates the number of revolutions per minute of the engine 1, sets an appropriate ignition timing for this cylinder 1a and starts the power supply to the ignition coil of the ignition coil and igniter combination 17. The above processing steps are repeated so that four ignitions and two injections per two revolutions of the crankshaft are carried out.

The operation of the conventional fuel control apparatus will be described in detail while referring to FIG. 10 which is a flow chart of a main routine. First, in Step M1, the ECU 100 is powered for initialization while setting therein necessary data for prescribed calculations and clearing the unillustrated RAM in the ECU 100. In Step M2, the output voltage of the coolant temperature sensor 15 is converted from analog to digital form and read out as a digital value. Then in Step M3, a coolant temperature correction coefficient is calculated on the basis of the presently measured temperature of the engine coolant and data of previously measured engine coolant temperatures prestored in the unillustrated ROM in the ECU 100. In Step M4, the output voltage of the intake air temperature sensor 14 is converted from analog to digital form and read out as a digital value. Subsequently in Step M5, an intake air temperature correction coefficient is calculated on the basis of the presently measured intake air temperature and data of previously measured intake air temperatures prestored in the ROM. In Step M6, the number of revolutions per minute of the engine 1, which is calculated in a crank angle timed interrupt process and stored in the RAM, is read out therefrom. The engine rpm is calculated by measuring the time between successive half revolutions of the engine crankshaft. Then in Step M7, cylinder pressure, which is measured in a crank angle timed interrupt process and stored in the RAM, is read out. In Step M8, basic fuel injection time is calculated on the basis of the presently measured cylinder pressure and the presently calculated engine rpm while looking at a two-dimensional map stored in the ROM in which the fuel injection time is plotted as a function of cylinder pressure and engine rpm, and the basic fuel injection time thus calculated is then multiplied by the above calculated engine coolant temperature correction coefficient and the above calculated intake air temperature correction coefficient to provide a corrected fuel injection time, which is stored in the RAM. Thereafter in Step M9, based on the presently measured cylinder pressure and the presently measured engine rpm, a basic ignition timing is calculated while looking at a two-dimensional map stored in the ROM in which the ignition timing is plotted as a function of the cylinder pressure and the engine rpm, and the basic ignition timing thus obtained is added by the above calculated engine coolant temperature correction coefficient to obtain a corrected ignition timing, which is stored in the RAM. In this manner, on the basis of the corrected fuel injection time and the corrected ignition timing thus set in the RAM, the injectors 5 and the ignition coil of the ignition coil and igniter combination 7 are driven or energized at respective timings as illustrated in the timing chart of FIG. 9.

Although in the above-described conventional fuel control apparatus, the calculation processes are based on the cylinder pressure measured at a point of time during each compression stroke, the amount of fuel to be injected can be calculated on the basis of a difference P between two cylinder pressures measured at two specific crank positions, as described in Japanese Patent Laid-Open No. 59-221433.

With the conventional fuel control apparatus as described above, the cylinder pressure on each compression stroke varies from one cycle to another. To compensate for such variations in the cylinder pressure, averaging the measured cylinder pressures is required, but this results in a delay in the processing time required for calculating the amount of intake air and the amount of fuel injection. Particularly, the response in fuel control during engine acceleration is impaired, reducing the output torque of the engine.

SUMMARY OF THE INVENTION

The present invention is intended to obviate the above-mentioned problems of the conventional fuel control apparatus.

An object of the invention is to provide a novel and improved fuel control apparatus for an internal combustion engine which has good response in fuel control even during engine acceleration while incurring no substantial reduction in the output torque.

In order to achieve the above object, according to one aspect of the present invention, there is provided a fuel control apparatus for an internal combustion engine comprising:

a pressure sensor for sensing internal pressure in a cylinder of the engine;

a signal generator for generating a cylinder identification signal and a crank angle signal in synchrony of the rotation with the engine;

a temperature sensor for sensing the temperature of intake air in an intake pipe of the engine;

a first fuel amount calculator for calculating a first amount of fuel to be injected into the cylinder based on the output of the temperature sensor and the output of the pressure sensor which is generated at prescribed crank angles during every compression stroke;

first fuel injection means for injecting the first amount of fuel, which is calculated by the fuel amount calculator, into the cylinder during a compression stroke or a subsequent power stroke;

an acceleration detector for detecting an acceleration of the engine;

a second fuel amount calculator for calculating, when an acceleration of the engine is detected by the acceleration detector, a second amount of fuel to be injected into the cylinder in dependence upon the engine accelerating condition as detected by the acceleration detector; and a second fuel injection means for injecting the second amount of fuel, which is calculated by the second fuel amount calculator, into the cylinder during an engine operating stroke thereof subsequent to the first fuel injection.

The pressure sensor senses the internal pressure in the cylinder at two different crank angles during every compression stroke thereof.

Preferably, the acceleration detector calculates the pressure difference between the cylinder internal pressures detected at two crank angles during every compression stroke of the cylinder, and it detects an acceleration of the engine when a rate of change of the pressure difference between the present pressure difference calculated on the present compression stroke and the preceding pressure difference calculated on the preceding compression stroke becomes greater than a prescribed value.

Preferably, the second fuel amount calculator calculates the second amount of fuel based on the rate of change of the cylinder internal pressure which is calculated by the acceleration detector.

According to another aspect of the invention, there is provided a fuel control apparatus for an internal combustion enging comprising:

pressure sensor means for sensing internal pressure in a plurality of cylinders of the engine;

a signal generator for generating a cylinder identification signal and a crank angle signal in synchrony with the rotation of the engine;

a temperature sensor for sensing the temperature of intake air in an intake pipe of the engine;

a first fuel amount calculator for calculating a first amount of fuel to be injected into one of the cylinders based on the output of the temperature sensor and the output of the pressure sensor means which are generated at prescribed crank angles during every compression stroke;

first fuel injection means for injecting the first amount of fuel, which is calculated by the fuel amount calculator, into one of the cylinders during a compression stroke or a subsequent power stroke thereof;

an acceleration detector for detecting an acceleration of the engine;

a second fuel amount calculator for calculating, when an acceleration of the engine is detected by the acceleration detector, a second amount of fuel to be injected into the one of the cylinders in dependence upon the engine accelerating condition as detected by the acceleration detector; and a second fuel injection means for injecting the second amount of fuel, which is calculated by the second fuel amount calculator, into the one of the cylinders during an engine operating stroke thereof subsequent to the first fuel injection.

The pressure sensor means senses the internal pressure in at least two of the cylinders at two different crank angles during every compression stroke thereof.

In one form, the acceleration detector calculates the pressure difference between the cylinder internal pressures detected at two crank angles during every compression stroke of at least two cylinders, and detects an acceleration of the engine when a rate of change of the pressure difference between the present pressure difference calculated on the present compression stroke of one of the at least two cylinders and the preceding pressure difference calculated on the preceding compression stroke of the other of the at least two cylinders becomes greater than a prescribed value.

In another form, the acceleration detector calculates the pressure difference between the cylinder internal pressures detected at the two crank angles during every compression stroke of at least two cylinders, and detects an acceleration of the engine when a rate of change of the pressure difference between the present pressure difference calculated on the present compression stroke of one of the at least two cylinders and the preceding pressure difference calculated on the preceding compression stroke of the one of the at least two cylinders becomes greater than a prescribed value.

The above and other objects, features and advantages of the present invention will become more readily apparent from the following detailed description of a preferred embodiment of the invention taken in conjunction with the accompanying drawings.

DESCRIPTION OF THE PREFERRRED EMBODIMENT

An embodiment of the invention will now be described in detail while referring to the accompanying drawings.

Figure 1:
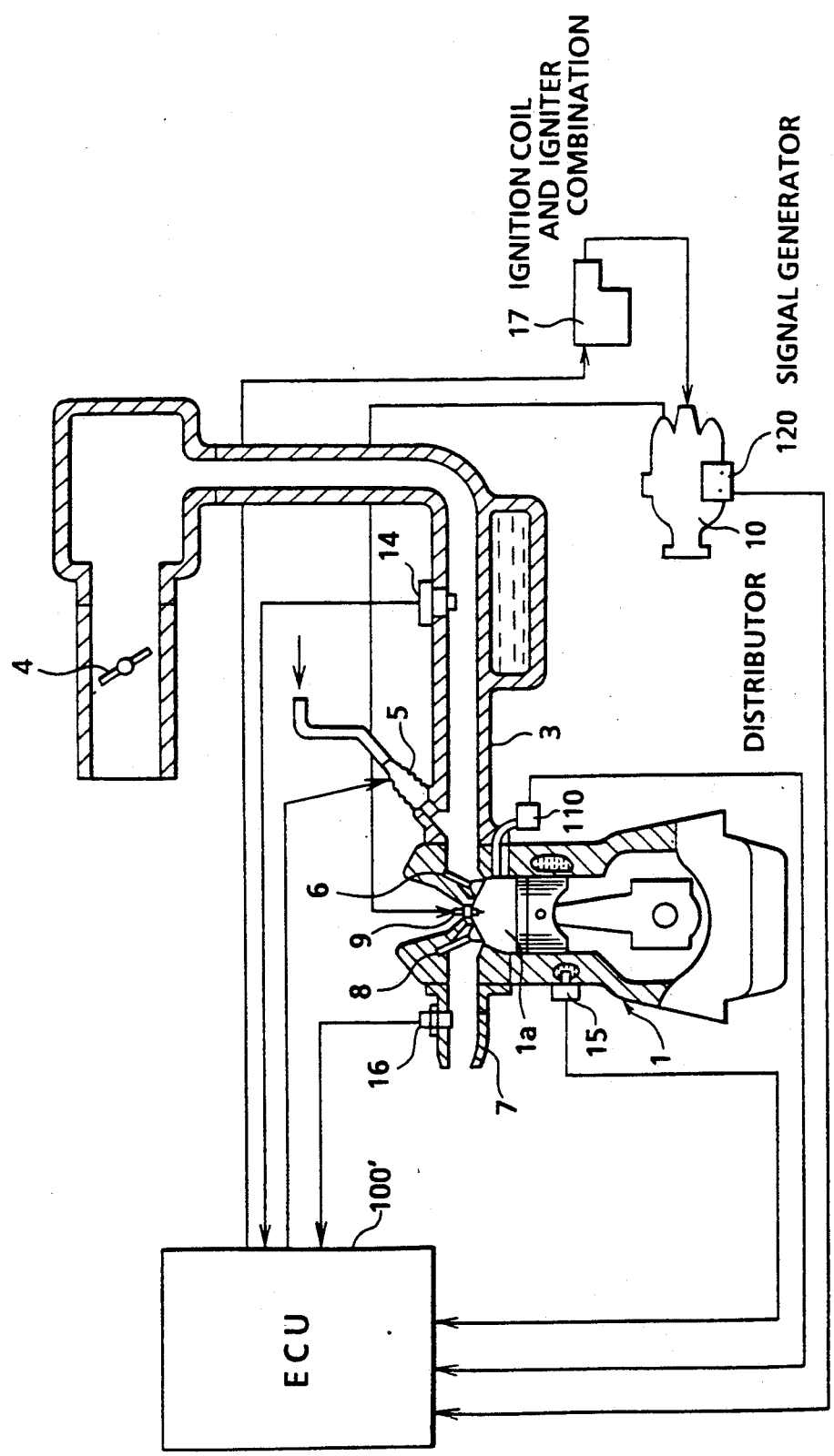
FIG. 1 is a view showing the general construction of a fuel control apparatus for an internal combustion engine in accordance with the present invention.
Figure 5:
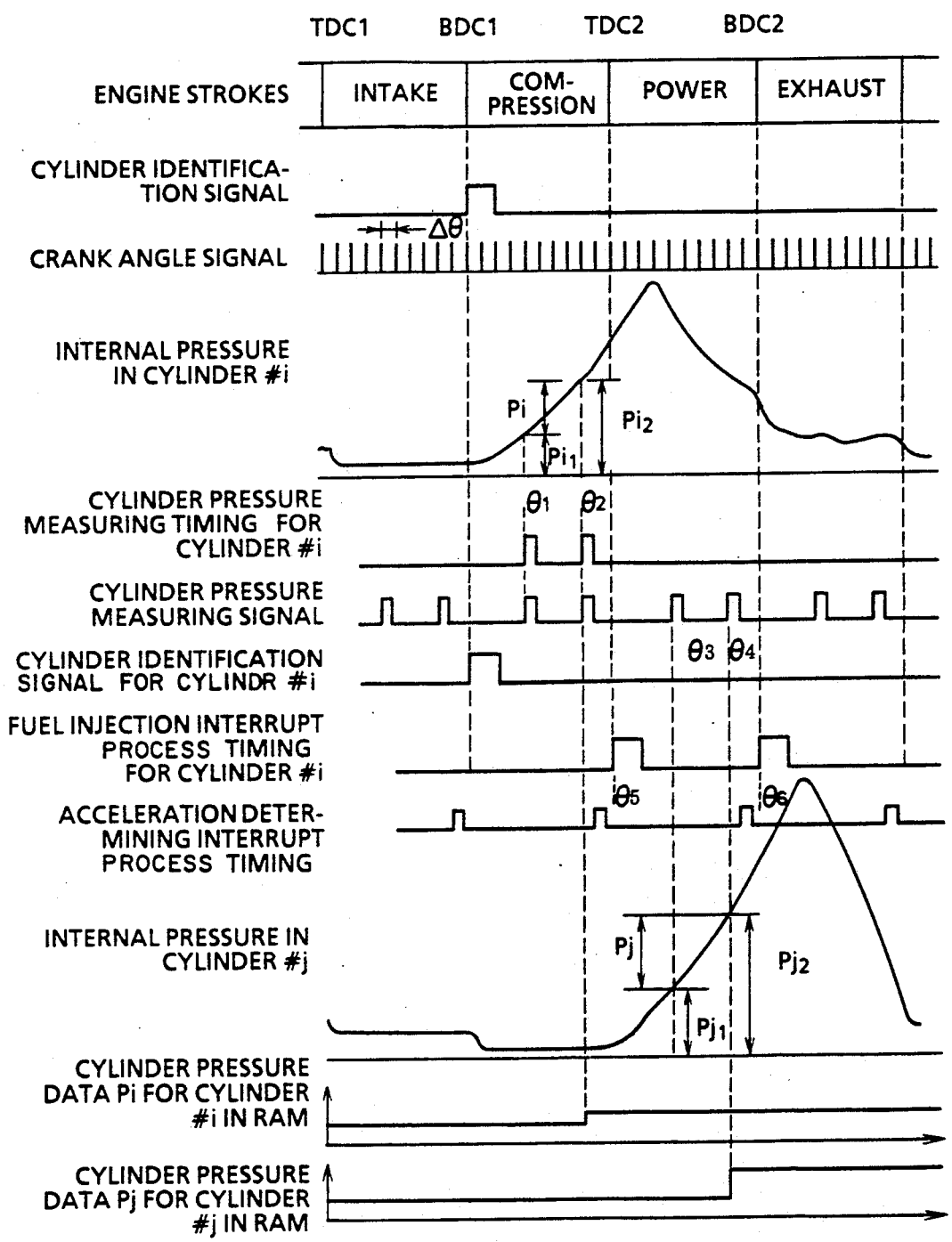
FIG. 5 is a timing chart showing time-related changes of a cylinder identification signal, a crank angle signal, cylinder pressures, and cylinder pressure data stored in a RAM as well as crank angle timed interrupt timing.
Figure 8:
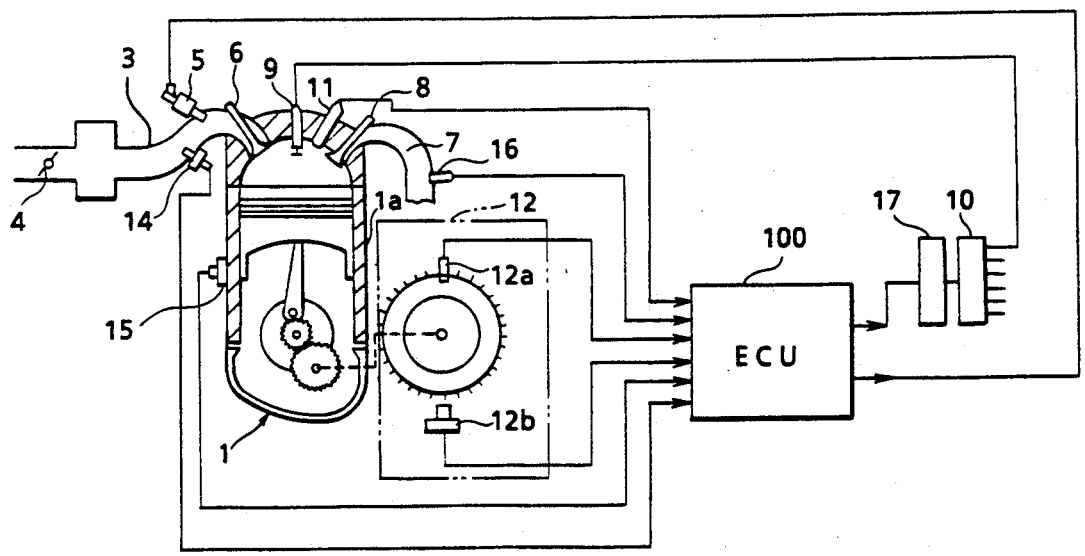
FIG. 8 is a view similar to FIG. 1, but showing a conventional fuel control apparatus for an internal combustion engine.
Figure 9:
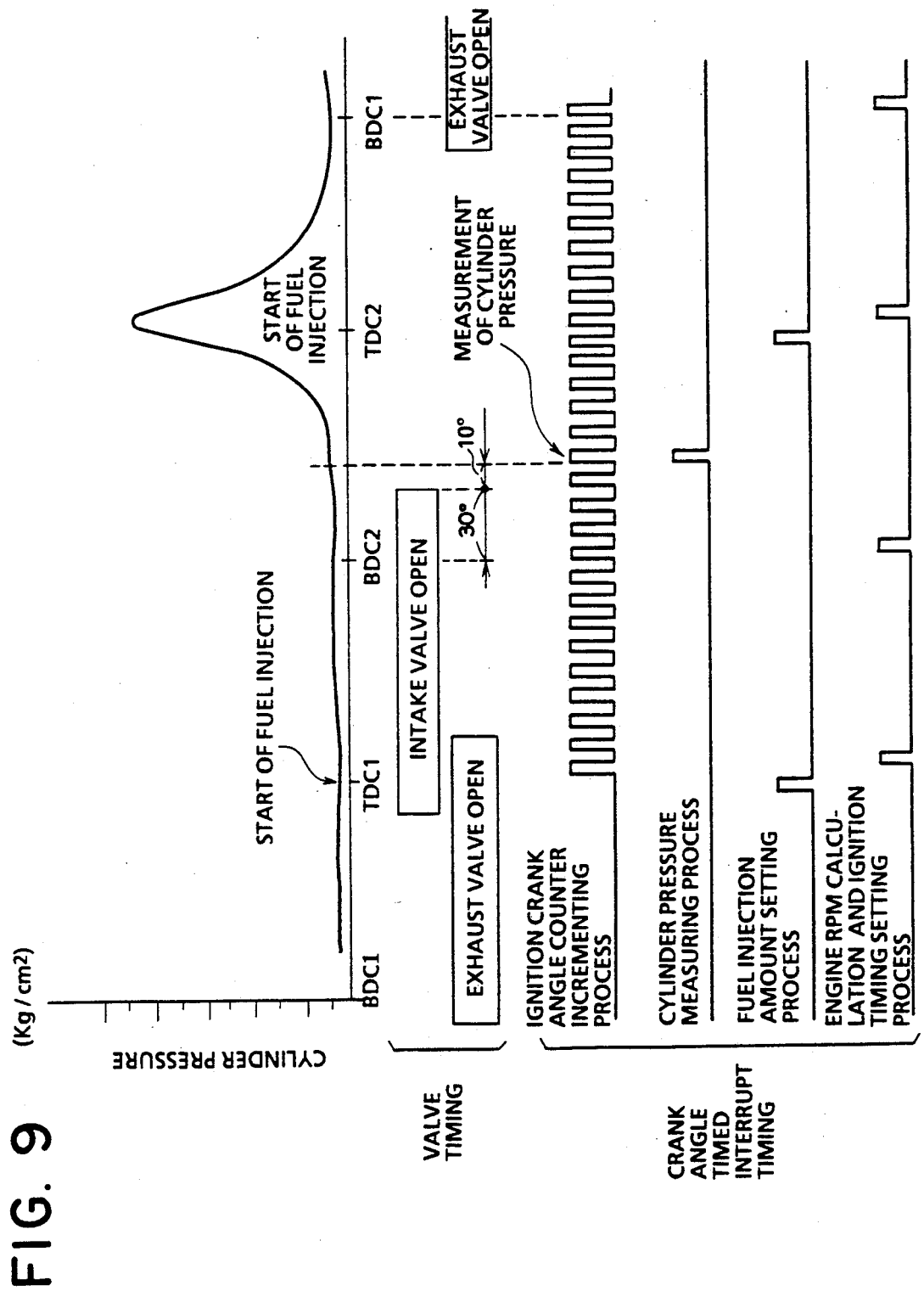
FIG. 9 is a timing chart showing a time-related change of the cylinder pressure, valve opening and closing timings, and crank angle timed interrupt timings of the conventional apparatus of FIG. 8.
Figure 10:
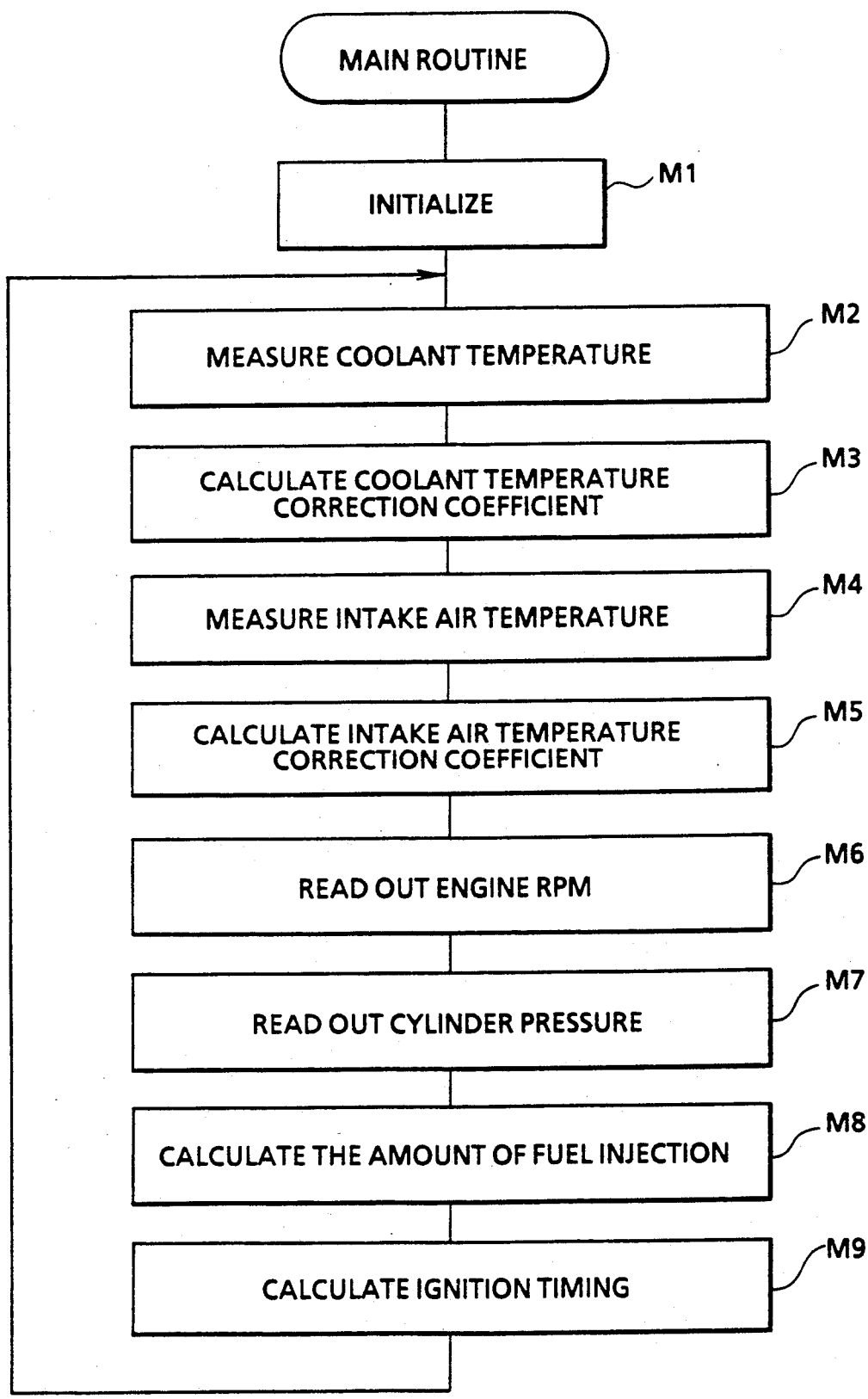
FIG. 10 is a flow chart showing a main routine executed by the conventional apparatus of FIG. 8.

Referring to the drawings and first to FIG. 1, there is shown a fuel control apparatus for an internal combustion engine constructed in accordance with the present invention. The apparatus illustrated is substantially similar in construction to the conventional apparatus of FIG. 8, and hence, it includes the same elements as those of the conventional apparatus which are designated by the same reference numerals. However, a pressure sensor 110, a signal generator 120 in the form of a rotation sensor and the operation of an ECU 100' employed in this embodiment are different from those used in the conventional apparatus of FIG. 8. Specifically, the pressure sensor 110 of this embodiment is of a semiconductor type utilizing piezo-resistance and is characteristic in that it provides an output voltage proportional to the absolute pressure in a cylinder 1a. In the case of a multi-cylinder internal combustion engine, a pressure sensor 110 is provided for each of the cylinders 1a. Also, though not illustrated in detail, the signal generator 120 of this embodiment generates two types of electrical signals. As shown in FIG. 5, one type of signal is a crank angle signal which is generated at prescribed intervals of crankshaft rotation, such as one pulse for every degree of crankshaft rotation. The other is a cylinder identification signal which is generated each time one of the pistons of the engine 1 is at a prescribed angular position. For example, in the present embodiment, the cylinder identification signal is generated each time one of the pistons is at bottom dead center at the start of its compression stroke. Many different types of signal generators are commonly available, and any type which can generate the desired signals can be employed. One common type of signal generator 120 which can be used includes a disk having a large number of slits formed in its outer periphery, the disk being mounted on the rotary shaft of the distributor 10 for rotation therewith which is driven to rotate by an appropriate portion of the engine 1 such as a camshaft which rotates in synchrony with the rotation of the engine crankshaft. A photocoupler is provided which has a light-emitting element such as an LED and a light-sensitive element such as a phototransistor which are disposed on the opposite sides of the rotary disk in alignment with one another. As the distributor shaft rotates, the disk also rotates and interrupts the passage of light from the light-emitting element to the light-sensitive element so that the light-sensitive element generates an output signal in the form of electrical pulses having a frequency corresponding to the rotational speed of the disk.

Figure 2:
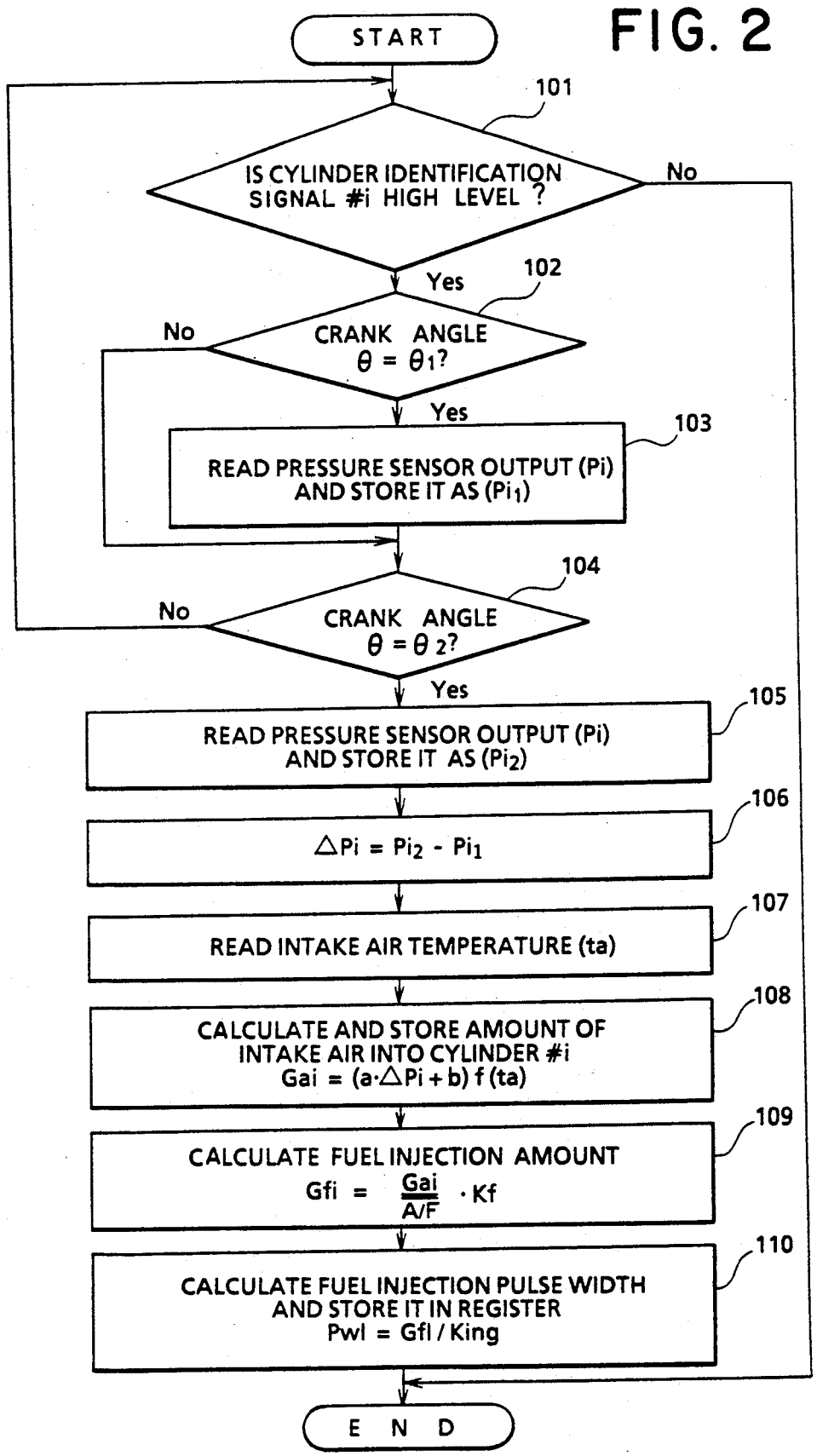
FIG. 2 is a flow chart showing a main routine executed by the fuel control apparatus of FIG. 1.
Figure 3:
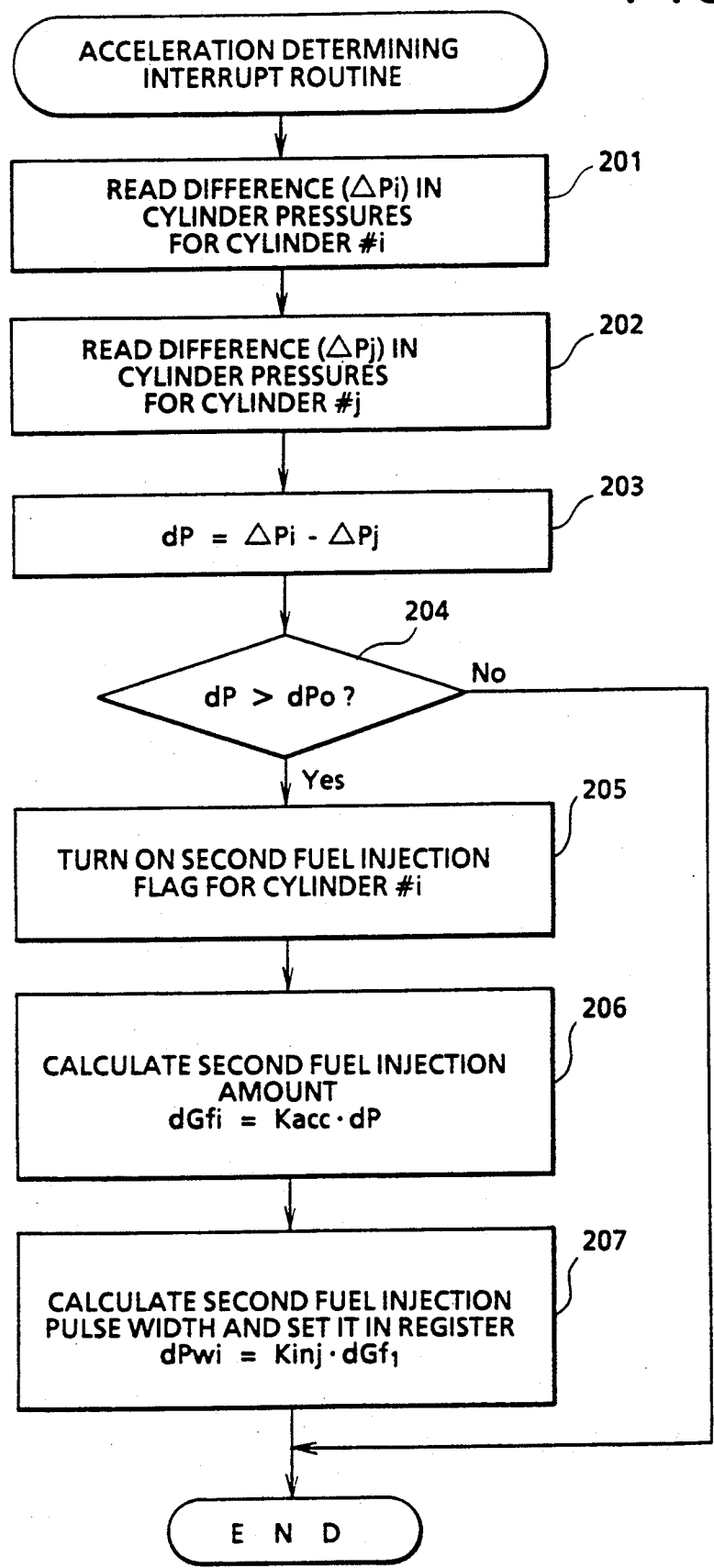
FIG. 3 is a flow chart showing a first or acceleration determining interrupt routine executed by the fuel control apparatus of FIG. 1.

Next, the operation of the fuel control apparatus of the invention as constructed above will be described below in detail while referring to the flow charts of FIGS. 2 through 4 and the timing charts of FIGS. 5 and 6.

Figure 7:
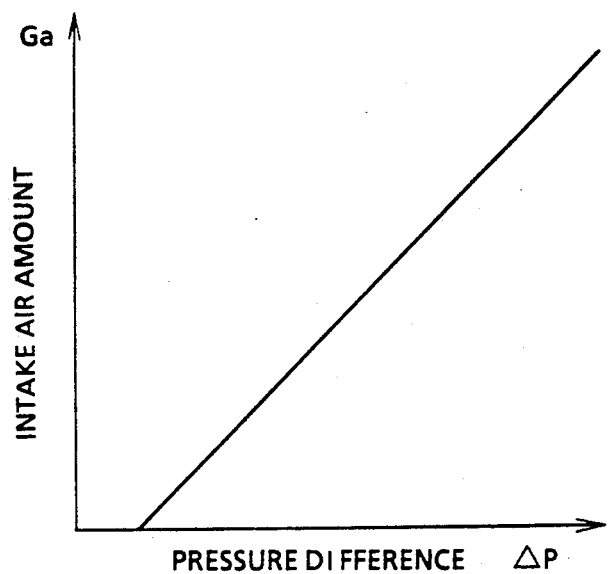
FIG. 7 is a graph showing the relationship between the intake air amount and the difference in the cylinder pressure.

As shown in the timing chart of FIG. 5, on the basis of a cylinder identification signal and a crank angle signal generated by the signal generator 120, the ECU 100' measures the internal pressures $P_{i1}$, $P_{i2}$ in cylinder #i at prescribed crank angles or positions $\theta_1$, $\theta_2$ during every compression stroke subsequent to the closing of the intake valve 6 of cylinder #i, and then calculates the amount of intake air $G_a$ based on the difference $\Delta P_i$ between the cylinder pressures $P_{i1}$, $P_{i2}$ thus measured using a predetermined relationship therebetween as illustrated in FIG. 7. Thereafter, a first or basic amount of fuel $G_{fi}$ to be injected from a corresponding injector 5 into cylinder #i is calculated based on the thus calculated intake air amount $G_a$, and then a pulse width for fuel injection corresponding to the calculated fuel amount is set in an unillustrated fuel injection register incorporated in the ECU 100'.

Subsequently, when the crankshaft of the engine 1 further rotates to reach a prescribed crank position TDC2 in which the piston in cylinder #i reaches top dead center, the ECU 100' starts to perform a fuel injection execution processing, i.e., it drives the fuel injector 5 for injecting the first or basic amount of fuel to cylinder #i. At crank positions $\theta_3$, $\theta_4$, a processing for measuring the internal pressure in cylinder #j like that for cylinder #i is performed to measure the pressures $P_{j1}$, $P_{j2}$ in cylinder #j at those crank positions and calculate a difference $\Delta P_j$ between these pressures $P_{j1}$, $P_{j2}$. Also, according to the acceleration determining interrupt routine of FIG. 3, it is determined whether the difference $dP = (\Delta P_i - \Delta P_j)$ is greater than a prescribed value $dP_o$ (i.e., $dP = (\Delta P_i - \Delta P_j) > dP_o$). This is to determine whether the engine 1 is accelerating. At the same time, a second or additional amount of fuel injection for acceleration is calculated and set in an unillustrated register in the ECU 100'. If the engine 1 is determined to be accelerating, the additional amount of fuel for acceleration is injected into cylinder #i during an engine stroke (i.e., power stroke in the illustrated embodiment) subsequent to the first injection of the basic amount of fuel which has normally been carried out at top dead center during every explosion or power stroke of the cylinder in the steady-state operation of the engine.

The calculation of the basic fuel injection amount, which is executed by the ECU 100' in accordance with a main program, will now be described with particular reference to the flow chart of FIG. 2. First, the cylinder identification signal and the crank angle signal, which are output by the signal generator 120, are read out and it is determined, in Step 101, whether the cylinder identification signal, containing square pulses which rise at bottom dead center during the compression stroke of a specific cylinder, is at a high level. If the answer is "YES", the program goes to Step 102 where a prescribed crank angle $\theta_1$, for example measured from the falling edge of a square pulse of the cylinder identification signal, has been reached. If the answer is "YES", the program goes to Step 103 where the output signal $P_i$ of the pressure sensor 11 for cylinder #i is read out and stored as $P_{i1}$ in a RAM or a register in the ECU 100' in the form of a microprocessor. Although the status of the various signals are illustrated as examples in FIG. 5, the waveforms of the crank angle signal and the cylinder identification signal are not limited to those shown in FIG. 5, and these signals can take other waveforms in which output pulses are generated at prescribed crank angles during every compression stroke.

Thereafter, in Step 104, it is determined whether the crank angle comes to or becomes equal to the prescribed second crank angle $\theta_2$. If the answer is "YES", the program goes to Step 105 where the output signal $P_i$ of the pressure sensor 11 is read out and stored as $P_{i2}$ in the RAM or register in the microprocessor. On the other hand, if the answer is "NO" in Step 102, the program skips to Step 104, and if the answer is also negative in Step 104, the program returns to Step 101. In Step 106, on the basis of the cylinder internal pressure data $P_{i1}$, $P_{i2}$ obtained in Steps 103, 105, respectively, the difference $\Delta P_i$ between these pressures $P_{i1}$, $P_{i2}$ is calculated and stored in the RAM. In Step 107, the output $t_a$ of the intake air temperature sensor 14 is read out and stored in the RAM. In Step 108, using a relationship between the pressure difference $\Delta P_i$ and the intake air amount $G_a$ as shown in FIG. 7, the amount of intake air $G_{ai}$ sucked into cylinder #i is calculated as follows:

$$G_{ai} = (a \times \Delta P_i + b) \times f(t_a)$$

where a and b are constants which are predetermined by experiment; and $f(t_a)$ is a coefficient of correction for converting the output signal $t_a$ of the intake air temperature sensor 14 representative of the engine temperature into a corresponding density of air. In this regard, exemplary values of the constants a and b may be 0.1 and 0.02, respectively. In addition, in performing the correction of intak air density based on the output signal $t_a$ of the intake air temperature sensor 14, precise correction can be done in principle if the average temperature of the mixture in each cylinder is used. It is difficult, however, in a practical sense to detect the mixture temperature because a temperature sensor provided in a cylinder is subject to extreme heat which is generated by the combustion of the mixture during the power strokes. Therefore, in this embodiment, the temperature of intake air in the intake manifold 3 is employed instead for such temperature correction.

Subsequently, in Step 109, an appropriate amount of fuel $G_{fi}$ to be injected for forming a prescribed air/fuel ratio (A/F) is calculated on the basis of the intake air amount $G_{ai}$ obtained in Step 108 using the following formula:

$$G_{fi} = \{G_{ai}/(A/F)\} \times K_f$$

where $K_f$ is a coefficient of correction for correcting the amount of fuel to be injected in accordance with the operating condition of the engine 1 such as when the engine is warming up.

In Step 110, the fuel injection amount $G_{fi}$ thus calculated is converted into a corresponding pulse width $P_{wi}$ for driving the injector 5 using the following formula:

$$P_{wi} = G_{fi}/K_{inj}$$

where $K_{inj}$ is a coefficient of conversion for converting the fuel injection amount into the width of a pulse for driving the injector 5. The pulse width $P_{wi}$ thus calculated is set in a injection register in the microprocessor, and the processing of the main routine ends.

In the steady-state operation of the engine 1, the ECU 100' starts the power supply to the injector 5 based on the data which is set in the injection register of the microprocessor in the above-described main routine which is executed at a prescribed crank angle of $\theta_5$ in accordance with a steady-state fuel-injection-starting interrupt routine. The first or basic fuel injection can be done on the compression stroke preceding the power stroke.

The above-described processing is carried out for the remaining cylinders in the same manner. Thus, the pressure difference $\Delta P_j$ between the internal pressures $P_{j1}$, $P_{j2}$ in cylinder #j at crank angles #3, #4 is calculated to find an appropriate basic fuel injection amount $P_{wj}$.

Next, a second or additional acceleration fuel injection interrupt processing, which is performed subsequent to the above-mentioned first steady-state basic fuel injection, will be described while referring to the flow charts of FIGS. 3 and 4. First, FIG. 3 shows an acceleration determining interrupt routine. In FIG. 3, in Step 201, the pressure difference $\Delta P_i$ for cylinder #i stored in the RAM is read out, and then in Step 202, the pressure difference $\Delta P_j$ stored in the RAM is read out. In Step 203, a rate of change dP between the pressure differences $\Delta P_i$ and $\Delta P_j$ is calculated ($dP = \Delta P_i - \Delta P_j$). In Step 204, it is determined whether the rate of change dP of the pressure difference is greater than a prescribed value $dP_o$ for engine acceleration determination. If the answer is "YES", the engine 1 is determined to be accelerating, and the program goes to Step 205 where a second fuel injection flag is turned on. Based on this flag, the power supply to the injector 5 for cylinder #i is started for injecting an additional amount of fuel in accordance with a second fuel injection interrupt routine as shown in FIG. 4. In Step 206, a second or additional amount of fuel $dG_{fi}$ is calculated as follows:

$$dG_{fi} = K_{acc} \times dP$$

where $K_{acc}$ is a coefficient of acceleration correction. In Step 207, a second fuel injection pulse width $dP_{wi}$ is calculated based on the above second or additional fuel amount $dG_{fi}$ as follows:

$$dP_{wi} = K_{inj} \times dG_{fi}$$

where $K_{inj}$ is an injection-amount to pulse-width conversion coefficient. The second fuel injection pulse width $dP_{wi}$ thus obtained is stored in the injection register of the microprocessor, and this interrupt routine terminates. On the other hand, however, if the answer in Step 204 is "NO", the first interrupt routine terminates.

Figure 4:
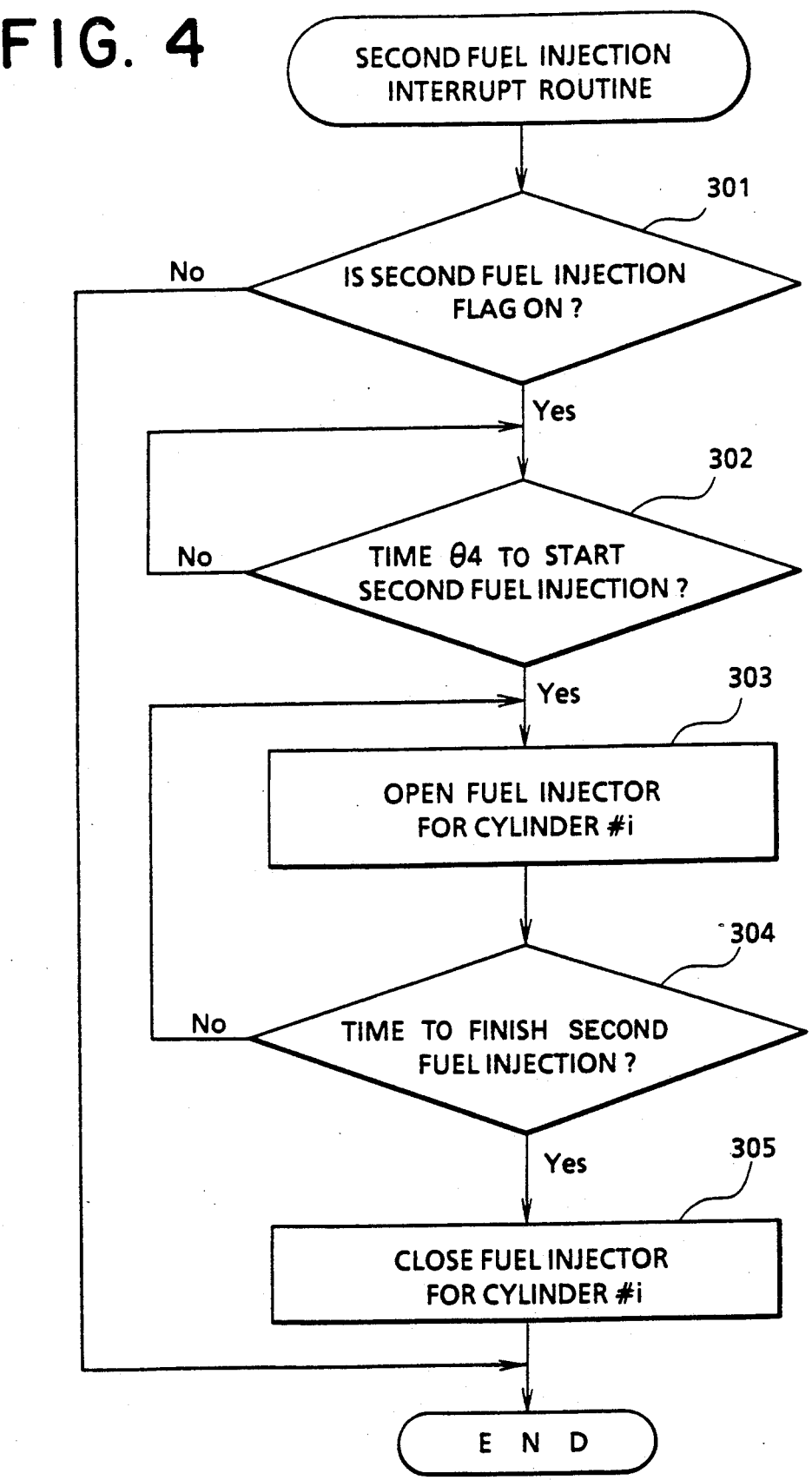
FIG. 4 is a flow chart showing a second or fuel injection interrupt routine executed by the fuel control apparatus of FIG. 1.

After the above acceleration determining interrupt processing, the second fuel injection interrupt routine of FIG. 4 is executed at a prescribed crank angle for performing a second fuel injection. In FIG. 4, in Step 301, it is determined whether the second fuel injection flag is on or off. If on, the program goes to Step 302 where it is determined whether the crank position of the engine 1 comes to time $\theta_4$ for starting a second fuel injection. If the answer is "YES", then in Step 303, the power supply to the injector 5 for cylinder #i is started for opening it. Thereafter, in Step 304, it is further determined whether a time for finishing the second fuel injection has come. If "NO", the program returns to Step 303 for continuing the second fuel injection. If "YES", the program goes to Step 305 where the power supply to the injector 5 for cylinder #i is stopped for closing it, and then this interrupt routine terminates.

Figure 6:
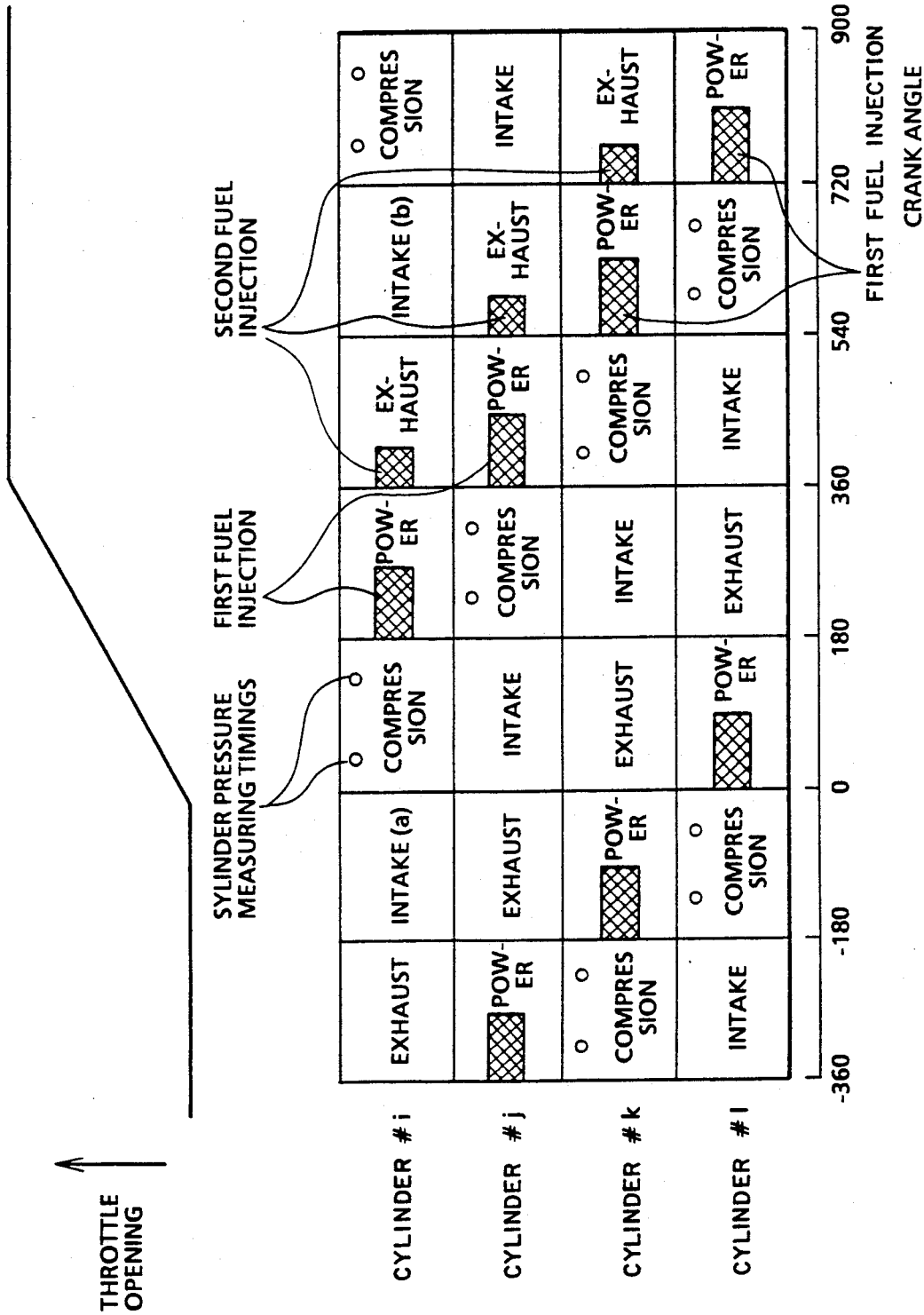
FIG. 6 is a timing chart showing first and second fuel injection and cylinder pressure measuring timings in relation to the throttle opening.

FIG. 6 shows the operation of the fuel control apparatus of this embodiment as described above with reference to FIGS. 2 through 4. More specifically, it is a timing chart showing a relationship between cylinder pressure measuring timing related to the engine crank angle and timings for first and second fuel injections for each cylinder. Since the pressure data for cylinder #i measured by the ECU 100' after a change in the throttle opening correspond to the amount of intake air sucked into the cylinder #i during an intake stroke (a) prior to the acceleration, the first or basic amount of fuel is short or insufficient for the amount of intake air to be sucked into the cylinder #i during the following intake stroke (b) after acceleration begins. However, this shortage in the fuel supply is compensated for by the second fuel injection.

Although in the above embodiment, the determination of engine acceleration and the second fuel injection are carried out on the basis of a rate of change in the difference between the internal pressure of cylinder #i during the compression stroke thereof and the internal pressure of cylinder #j during the compression stroke thereof, they can be done based on a rate of change of the difference between the internal pressures of cylinder #i during the Nth and (N+1)th compression strokes thereof. Also, they can be done as well based on a rate of change $(dP = \Delta P_{i,N+1} - P_{im})$ between the average $$\left( \Delta P_{im} = (1/N) \sum_{k=1}^{N} P_{ik} \right)$$

of the difference in the internal pressures $(\Delta P_{i1} - \Delta P_{iN})$ of cylinder #i during the 1st-Nth compression strokes thereof and the difference in the internal pressures $P_{i,N+1}$ of cylinder #i during the Nth and (N+1)th compression strokes thereof.

Further, although in the above embodiment, a pressure sensor 110 is provided for each cylinder and the amount of fuel to be injected into each cylinder 1a is controlled on the basis of the output signals of the pressure sensors, a single pressure sensor or a reduced number (e.g., one half of the total of all the cylinders) of pressure sensors may be employed for all the cylinders so that the fuel supply to all or part of the cylinders can be controlled on the basis of the output(s) of the sensor(s). In this case, the overall costs for manufacture can be reduced though there is some accompanying degradation in the control accuracy.

As described in the foregoing, according to the present invention, during engine acceleration, an additional amount of fuel is injected on an engine stroke subsequent to a first fuel injection on the basis of a rate of change of the difference in the cylinder internal pressures, so that response in fuel control upon engine acceleration can be improved to a substantial extent, thus enhancing the control accuracy without any resultant decrease in the output torque. As a result, good drivability of the vehicle, on which the present fuel control apparatus is installed, is obtained.

What is claimed is:

1. A fuel control apparatus for an internal combustion engine comprising:
    a pressure sensor for sensing internal pressure in a cylinder of the engine;
    a signal generator for generating a cylinder identification signal and a crank angle signal in synchrony with the rotation of the engine;
    a temperature sensor for sensing the temperature of intake air in an intake pipe of the engine;
    a first fuel amount calculator for calculating a first amount of fuel to be injected into the cylinder based on the output of said temperature sensor and the output of said pressure sensor which is generated at least two prescribed crank angles during every compression stroke;
    first fuel injection means for injecting the first amount of fuel, which is calculated by said fuel amount calculator, into the cylinder during a compression stroke or a subsequent power stroke;
    an acceleration detector for detecting an acceleration of the engine;
    a second fuel amount calculator for calculating, when an acceleration of the engine is detected by said acceleration detector, a second amount of fuel to be injected into the cylinder in dependence upon the engine accelerating condition as detected by said acceleration detector; and
    a second fuel injection means for injecting the second amount of fuel, which is calculated by said second fuel amount calculator, into the cylinder during an engine operating stroke thereof subsequent to the first fuel injection.

2. A fuel control apparatus according to claim 1, wherein said pressure sensor senses the internal pressure in the cylinder at two different crank angles during every compression stroke thereof.

3. A fuel control apparatus according to claim 2, wherein said acceleration detector calculates the pressure difference between the cylinder internal pressures detected at two crank angles during every compression stroke of the cylinder, and detects an acceleration of the engine when a rate of change of the pressure difference between the present pressure difference calculated on the present compression stroke and the preceding pressure difference calculated on the preceding compression stroke becomes greater than a prescribed value.

4. A fuel control apparatus according to claim 3, wherein said second fuel amount calculator calculates the second amount of fuel based on the rate of change of the cylinder internal pressure which is calculated by said acceleration detector.

5. A fuel control apparatus for an internal combustion engine comprising:
    pressure sensor means for sensing internal pressure in a plurality of cylinders of the engine;
    a signal generator for generating a cylinder identification signal and a crank angle signal in synchrony with the rotation of the engine;

a temperature sensor for sensing the temperature of intake air in an intake pipe of the engine;

a first fuel amount calculator for calculating a first amount of fuel to be injected into one of the cylinders based on the output of said temperature sensor and the output of said pressure sensor means which are generated at prescribed crank angles during every compression stroke;

first fuel injection means for injecting the first amount of fuel, which is calculated by said fuel amount calculator, into one of the cylinders during a compression stroke or a subsequent power stroke thereof;

an acceleration detector for detecting an acceleration of the engine;

a second fuel amount calculator for calculating, when an acceleration of the engine is detected by said acceleration detector, a second amount of fuel to be injected into said one of the cylinders in dependence upon the engine accelerating condition as detected by said acceleration detector; and a second fuel injection means for injecting the second amount of fuel, which is calculated by said second fuel amount calculator, into said one of the cylinders during an engine operating stroke thereof subsequent to the first fuel injection.

6. A fuel control apparatus according to claim 5, wherein said pressure sensor means senses the internal pressure in at least two of the cylinders at two different crank angles during every compression stroke thereof.

7. A fuel control apparatus according to claim 6, wherein said acceleration detector calculates the pressure difference between the cylinder internal pressures detected at the two crank angles during every compression stroke of the at least two cylinders, and detects an acceleration of the engine when a rate of change of the pressure difference between the present pressure difference calculated on the present compression stroke of one of the at least two cylinders and the preceding pressure difference calculated on the preceding compression stroke of the other of the at least two cylinders becomes greater than a prescribed value.

8. A fuel control apparatus according to claim 7, wherein said second fuel amount calculator calculates the second amount of fuel based on the rate of change of the cylinder internal pressure which is calculated by said acceleration detector.

9. A fuel control apparatus according to claim 6, wherein said acceleration detector calculates the pressure difference between the cylinder internal pressures detected at the two crank angles during every compression stroke of the at least two cylinders, and detects an acceleration of the engine when a rate of change of the pressure difference between the present pressure difference calculated on the present compression stroke of one of the at least two cylinders and the preceding pressure difference calculated on the preceding compression stroke of said one of the at least two cylinders becomes greater than a prescribed value.

10. A fuel control apparatus according to claim 9, wherein said second fuel amount calculator calculates the second amount of fuel based on the rate of change of the cylinder internal pressure which is calculated by said acceleration detector.

* * * * *